June 18, 1940.   C. R. HANNA   2,205,257
CENTRIFUGAL GOVENOR WITH LARGE ANTICIPATION
Filed April 28, 1938   2 Sheets-Sheet 1
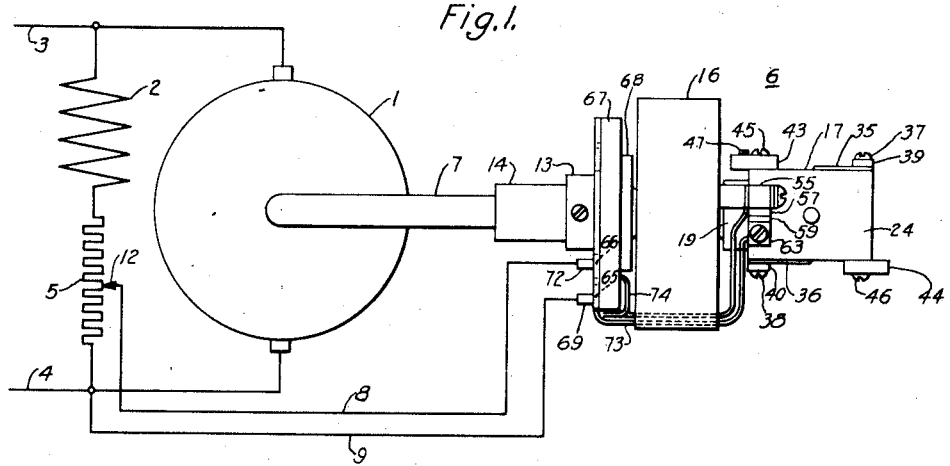
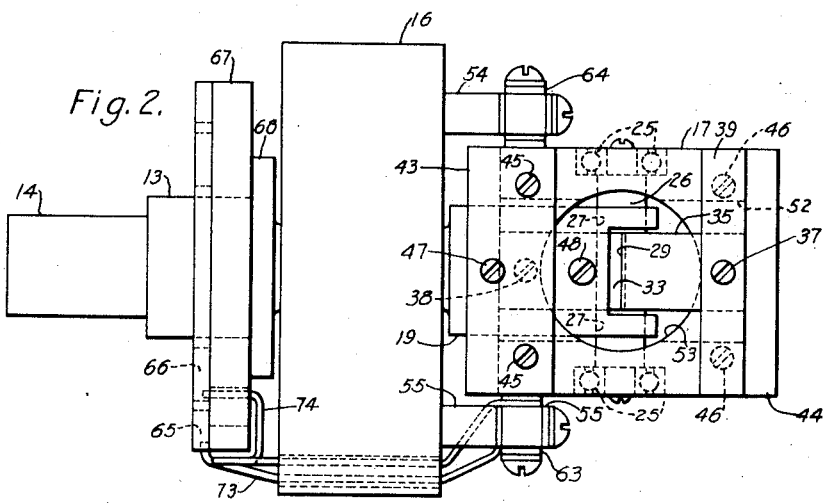
WITNESSES:
INVENTOR
Clinton R. Hanna
BY
ATTORNEY June 18, 1940.                C. R. HANNA                2,205,257
              CENTRIFUGAL GOVENOR WITH LARGE ANTICIPATION
                    Filed April 28, 1938        2 Sheets-Sheet 2

WITNESSES:
Fred C. Williams
F. E. Hardy

INVENTOR
Clinton R. Hanna
BY Ezra W. Savage
ATTORNEY

Patented June 18, 1940

2,205,257

UNITED STATES PATENT OFFICE 2,205,257

CENTRIFUGAL GOVERNOR WITH LARGE ANTICIPATION

Clinton R. Hanna, Pittsburgh, Pa., assignor to Westinghouse Electric & Manufacturing Company, East Pittsburgh, Pa., a corporation of Pennsylvania Application April 28, 1938, Serial No. 204,771

7 Claims. (Cl. 200—80)

My invention relates to centrifugal speed regulators for governing the speed of regulated devices, such as electric motors and the like.

Speed regulators of the centrifugal type usually possess hunting characteristics caused by the necessity of an appreciable departure in the speed of the revolving inertia member from its desired value before a corrective force is developed of sufficient intensity to produce the necessary corrective force, and the inability of this corrective force, once it is established, to discontinue its influence prior to a completion of the corrective action. Thus, the inertia of the corrective force causes over-correction or hunting.

In such regulators, the accuracy of regulation may be greatly improved if the speed controlled mechanism is responsive not only to variations in speed from the desired value, but also to the acceleration that anticipates such speed changes, and which occurs as the speed of the regulated member starts away from its desired value. The force of acceleration may become effective before any substantial change in the speed of the regulated device has occurred, and may, therefore, be employed to introduce a corrective influence into the regulator system earlier than would be the case if the regulator responded to speed variations alone.

Such speed regulators are also frequently subject to errors occasioned by the effect of gravity on the centrifugal elements.

It is an object of my invention to provide a centrifugal speed governor that is responsive both to the regulated quantity and to the rate of change of that quantity from its desired value.

It is another object of my invention to provide a centrifugal speed governor of the indicated character that is balanced as to gravity vibrations.

It is a further object of my invention to provide a speed regulator employing an inertia element having one degree of freedom of motion and a centrifugal element having one degree of freedom of motion, the two elements cooperating to control the speed of the regulated quantity in response both to the speed and acceleration of the regulated quantity.

My invention will be better understood by reference to the accompanying drawings, in which:

Figure 1 is a diagrammatic view of one embodiment of the invention, the regulator mechanism being shown in a position referred to for convenience as side elevation;

Fig. 2 is a top plan view of the regulator mechanism;

Figure 3:
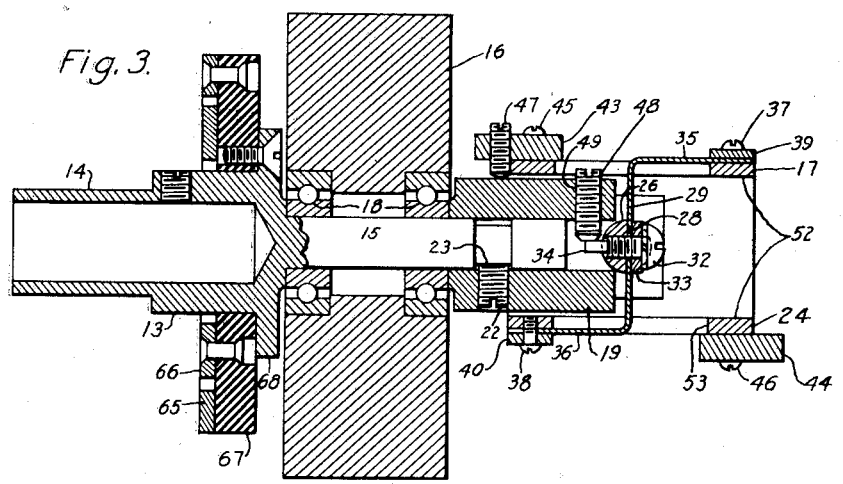
Fig. 3 is a sectional view taken along the line III—III of Fig. 5.

Referring to the drawings, the regulated device is shown as an electric motor having an armature winding 1 and a field winding 2 that are supplied with electric energy from a circuit represented by conductors 3 and 4, a variable resistor 5 being shown in series circuit relation with the field winding 2.

A speed regulator indicated generally at 6 is connected to the motor shaft 7 to be driven in accordance with the speed of the motor being regulated for varying the effective value of the field regulating resistor 5 through circuit conductors 8 and 9. The conductor 8 is shown connected to a movable contact member 12 that is adjustably connected to a selected point on the resistor 5.

Figure 4:
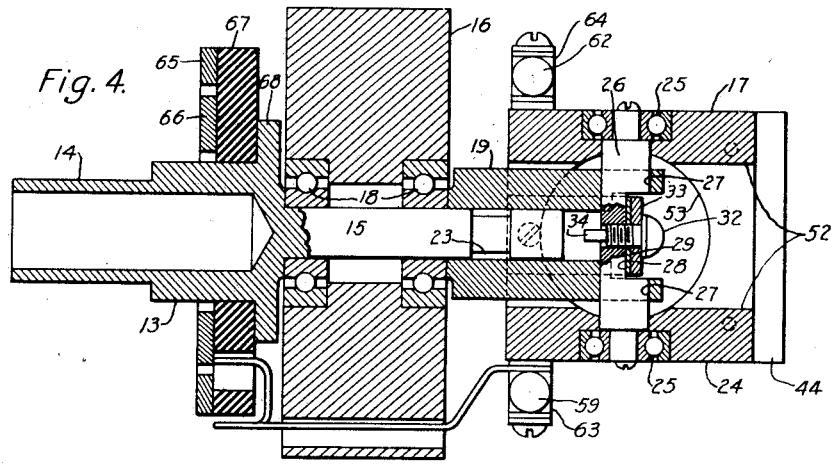
Fig. 4 is a sectional view taken along the line IV—IV of Fig. 5.

The regulating mechanism 6 comprises a revolving member 13, which, as illustrated in Figs. 3 and 4, is provided at one end with a sleeve portion 14 that may be fitted over the motor shaft 7, and a shaft portion 15 upon which is mounted an inertia member 16 and a centrifugal member 17. The inertia member 16 is mounted on the shaft portion 15 of the revolving member 13 by ball bearings 18, so as to possess a degree of freedom of motion about the axis of the shaft 15 for a purpose to be later explained.

A hollow sleeve or collar 19 is provided that surrounds and extends beyond the outer end of the shaft portion 15 and is held in place thereon by a set screw 22 which fits into a recess 23 in the shaft 15, so that the collar 19 is rotated with the shaft 15. The centrifugal member 17 includes a cage 24, here shown as rectangular in general outline, having a bore 52 extending longitudinally therethrough and a bore 53 extending centrally downwardly therethrough. The cage 24 is mounted on the collar 19, which extends within the bore 52, by means of ball bearings 25 on the outer ends of a pin 26 that extends through bores 27 in the outer end of the collar 19. One side of the central portion of the pin 26 is flattened, as best shown at 28 in Figs. 3 and 4, to receive the central portion of a flat spring 29 that is attached to the pin 26 by means of a screw 32 and washer 33, the end portion of the screw 32 terminating in an extension 34. The flat spring 29 extends axially within the bore 53, the upper and lower ends 35 and 36, respectively, being bent at right angles to the central portion thereof to extend horizontally in the planes of the upper and lower surfaces of the cage 24, and are attached thereto at the opposite upper right and lower left portions thereof, as viewed in Fig. 3, by means of screws 37 and 38, respectively, which extend through flat plate or washer members 39 and 40. The vertical portion of the spring 29, as viewed in Fig. 3, is so positioned with respect to the ends thereof as to pass through the center of gravity of the cage 24.

In order to provide a centrifugal couple to rotate the cage 24 in a clockwise direction about the axis of the pin 26, weights 43 and 44 are attached to the cage 24 at the upper left and lower right portions thereof, as viewed in Fig. 3, by means of screws 45 and 46, respectively. A set screw 47 is provided to limit the movement of the centrifugal member in a counter-clockwise direction, the inner end of the pin being adapted to engage the collar 19. An adjusting screw 48 is provided extending through a bore 49 in the collar 19, the inner end of which engages the extension 34 on the screw 32 to bias the flat spring 29 to create a predetermined force in opposition to the centrifugal force exerted by the weights 43 and 44.

Studs 54 and 55 extend outwardly from the inertia member 16 on opposite sides of the cage 24 and carry contact members 57 and 58, respectively, on their outer ends so positioned as to engage cooperating contact members 59 and 62, respectively, carried by studs 63 and 64 that extend outwardly from the opposite sides of the cage 24. Collector rings 65 and 66 are provided, mounted on an insulating disc 67 that is attached to a flange 68 on the rotating member 13, and cooperate with brushes 69 and 72, respectively, shown in Fig. 1 to complete a circuit through conductors 9 and 8 to control the effective value of the resistor 5.

As best shown in Figs. 1 and 2, the collector ring 65 is connected by a conductor 73 to the contact member 59 carried by stud 63, and the collector ring 66 is connected by a conductor 74 to the contact member 57 carried by stud 55. The engagement and separation of the contact members 57 and 59 control the effective value of the field resistor 5 to control the speed of the regulated motor, as will be later explained. If the controlled motor is a reversible motor, the contact members 58 and 62 may be connected through additional slip rings provided on the disc 67 for controlling the field resistor 5 when the motor is operating in a reverse direction. As illustrated, the contact members 58 and 62 are not electrically connected to a circuit, but together with the contact members 57 and 58 perform a mechanical function to be later explained.

Figure 5:
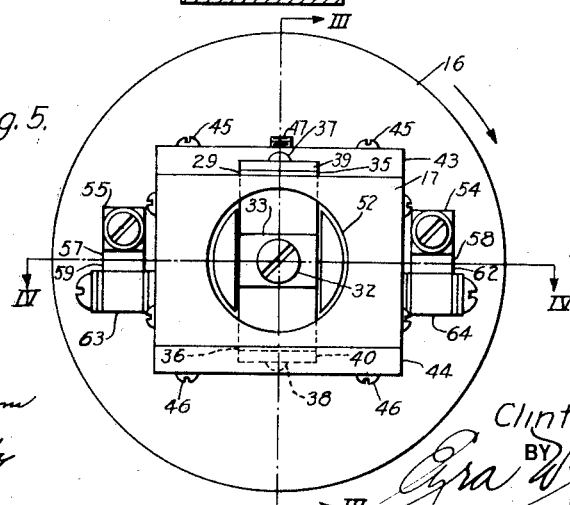
Fig. 5 is an end view of the governor mechanism.

During the operation of the regulator, as the shaft 15 is rotated about its axis in accordance with the speed of rotation of the motor being regulated, the weights 43 and 44 produce a couple due to centrifugal force, the weight 43 pulling upwardly as viewed in Fig. 3 and the weight 44 pulling downwardly, thus producing a clockwise torque about an axis along the center of the pin 26, which is resisted by the force of the spring 29, the tension of which is determined by the setting of the screw 48. This centrifugal couple moves the contact members 59 and 62 upwardly, as viewed in Fig. 5, toward the contact member 57 and 58, respectively, that are carried by the inertia member 16 to cause engagement of the cooperating pairs of contact members with a small average force determined by the contact pressure required to pass the amount of current necessary to maintain the motor at its regulated speed. The inertia member 16 is driven in a clockwise direction, as viewed in Fig. 5, by the mechanical engagement of the contact members 57 and 59.

When the motor is revolving at a constant speed, the inertia torque of angular acceleration of the inertia member 16 about its axis of rotation is zero. If the motor tends to increase its speed, the inertia of the flywheel 16 due to its inherent tendency to resist a change in speed causes an inertia torque in a direction to increase the contact pressure between contact members 57 and 59 and decrease the contact pressure between the contact members 58 and 62. This increase in average pressure between the contact members 57 and 59 increases the average short circuit current through conductors 8 and 9 and the field current through the field winding 2 to decrease the motor speed.

It will be seen, therefore, that the force acting at the contacts 57 and 59 against the spring 29 is determined by two components, one of which varies with the angular velocity or speed, and the other with the angular acceleration or rate of change of speed.

In the normal operation of the regulator, the motor constantly varies its speed slightly within narrow limits to cause the intermittent engagement and separation of the contact members 57 and 59 to vary the ratio of time between the short circuit of, and the inclusion in the field winding of that portion of the resistor 5 between the contact member 12 and the conductor 4. As the speed of the motor is increasing above its desired value, the angular torque of acceleration about the axis of rotation of the flywheel 16 produces a component of force in a direction to increase the pressure between contact members 57 and 59.

The force due to the torque of acceleration acting on the flywheel 16 acts to vary the average pressure between the contact members 57 and 59 in the same direction as does the centrifugal force acting on weights 43 and 44, but anticipates a change in the centrifugal force caused by a change in speed, so that the combined effect of these two forces causes the contact members 57 and 59 to engage earlier than would be the case were they responsive to centrifugal force alone. Upon engagement of the contact members 57 and 59, the short circuit through that portion of the resistor 5 between the contact member 12 and the conductor 4 increases the excitation of the field winding 2 to decrease the speed of the motor.

Correspondingly, if the motor is decreasing its speed below the desired value, the negative angular acceleration, or deceleration, of the motor shaft is in a direction to cause an earlier separation of the contact members 57 and 59 to insert the lower portion of the resistor 5 in the field winding circuit earlier than would be the case if the contact members were actuated by a change in centrifugal force alone, causing the speed of the motor to be increased. Such decrease in pressure between contacts 57 and 59 can occur because of an increase in pressure between members 58 and 62.

It will thus be appreciated that the effect of the angular torque of acceleration or deceleration of the flywheel 16 about its axis of rotation is effective to produce a change in the contact pressure between the contact members 57 and 59 in the same direction as the component of force resulting from the change in centrifugal force acting upon the weights 43 and 44 caused by the resulting increase or decrease in speed following such acceleration or deceleration. Thus the acceleration or deceleration of the regulated motor causes an operation of the contact members 57 and 59 in anticipation of speed changes to initiate corrective actions before such change in speed has become appreciable, and to thereby maintain a more accurate speed and prevent hunting of the regulated motor.

It will also be appreciated that once the corrective action has been initiated and the resulting correction begins to be felt on the regulated motor, the component of force responsive to the inertia torque of acceleration from the flywheel 16 disappears rapidly so that the total resulting pressure between the contact members 57 and 59 is changed prior to a completion of the desired correction. The acceleration component of force, therefore, acting through the flywheel 16 aids both in starting a corrective action in anticipation of an error in speed, and also in ending the corrective action in anticipation of the completion of the corrective influence. This characteristic starting operation decreases the permitted error in the motor speed and increases the sensitivity of the regulator, and at the same time prevents or reduces hunting action.

Many changes in the apparatus and circuits disclosed will be apparent to those skilled in the art within the spirit of my invention, and I do not wish to be limited otherwise than by the scope of the appended claims.

I claim as my invention:

1. In a speed regulator for controlling the speed of a rotating member, an inertia member driven in accordance with the speed of the rotating member and possessing a degree of freedom of movement about its axis of rotation, a centrifugal member driven in accordance with the speed of the rotating member and possessing a degree of freedom of movement about an axis at an angle to its axis of rotation, and means responsive to the relative movements of said inertia member and said centrifugal member.

2. In a speed regulator for controlling the speed of a rotating member, an inertia element and a centrifugal element mounted upon a supporting member for rotation about a common axis in accordance with the speed of the rotating member, said inertia element being mounted to possess a freedom of motion about its axis of rotation, said centrifugal element being mounted to possess freedom of motion about an axis at an angle to its axis of rotation, said inertia member being responsive to movement about its axis of freedom of motion upon a change in the speed of rotation of the supporting member, said centrifugal member being responsive to a centrifugal couple established by the distribution of the mass about its axis of freedom and being free from other dynamic couple and from gravity unbalance about its axis of freedom, and means responsive to the relative movements of said inertia member and said centrifugal member.

3. In a speed regulator for controlling the speed of a rotating member, an inertia element and a centrifugal element mounted upon a supporting member for rotation about a common axis in accordance with the speed of the rotating member, said inertia element being mounted to possess a freedom of motion about its axis of rotation, said centrifugal element being mounted to possess freedom of motion about an axis at an angle to its axis of rotation, a contact member carried by said inertia member and a cooperating contact member carried by said centrifugal member, said inertia member being responsive to movement about its axis of freedom upon acceleration of the supporting member to urge the contact member carried thereby toward its cooperating contact member, and said centrifugal member being responsive to movement about its axis of freedom to urge the contact member carried thereby toward its cooperating contact member upon an increase in the speed of the supporting member.

4. In a speed regulator for controlling the speed of a rotating member, a shaft driven in accordance with the speed of the rotating member, an inertia element and a centrifugal element mounted on said shaft, said inertia element being mounted to possess a freedom of motion about its axis of rotation, said centrifugal element being mounted to possess a freedom of motion about an axis at right angles to its axis of rotation and being responsive to a centrifugal couple established by the distribution of the mass about its axis of rotation and being free from any other dynamic couple and free from gravity unbalance about its axis of freedom, and means responsive to the relative movements of said inertia member and said centrifugal member.

5. In a speed regulator for controlling the speed of a rotating member, a shaft driven in accordance with the speed of the rotating member, an inertia element and a centrifugal element mounted on said shaft, said inertia element being mounted to possess a freedom of motion about its axis of rotation, said centrifugal element being mounted to possess a freedom of motion about an axis at right angles to its axis of rotation, two contact members carried by said inertia element on opposite sides of its axis of rotation, and two contact members carried by said centrifugal element for engaging, respectively, the contact members carried by said inertia element, said centrifugal element being responsive to a centrifugal couple established by the distribution of its mass about its axis of rotation, the mass of the centrifugal member being arranged to provide a centrifugal couple about its axis of rotation for urging the contact members carried thereby toward the associated contact members carried by the inertia element.

6. In a device of the character described, in combination, a rotatable shaft, an inertia member driven in accordance with the speed of rotation of the shaft and possessing a degree of freedom of movement about its axis of rotation, a centrifugal member driven in accordance with the speed of rotation of the shaft and possessing a degree of freedom of movement about an axis at right angles to its axis of rotation, a contact member carried by said inertia member and a cooperating contact member carried by said centrifugal member, and means controlled in response to the relative movement of said contact members.

7. In a regulator for controlling the value of a regulated quantity, an inertia member driven at a speed that is a measure of the regulated quantity and possessing a degree of freedom of movement about its axis of rotation, a centrifugal member positioned adjacent the inertia member and driven about the same axis of revolution and at the same speed as the inertia member and possessing a degree of freedom of movement about an axis at an angle to its axis of rotation, and control means responsive to the relative movements of said inertia member and said centrifugal member.

CLINTON R. HANNA.